(12) United States Patent
Yoshioka et al.

(10) Patent No.: US 6,440,608 B1
(45) Date of Patent: Aug. 27, 2002

(54) CELL AND METHOD OF PRODUCING THE SAME

(75) Inventors: Shoji Yoshioka; Makiko Kise; Hiroaki Urushibata; Hisashi Shiota; Jun Aragane; Shigeru Aihara; Daigo Takemura; Takashi Nishimura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/485,693

(22) PCT Filed: Jun. 25, 1998

(86) PCT No.: PCT/JP98/02858

§ 371 (c)(1),
(2), (4) Date: Feb. 25, 2000

(87) PCT Pub. No.: WO99/67839

PCT Pub. Date: Dec. 29, 1999

(51) Int. Cl.$^7$ ................................................ H01M 4/32
(52) U.S. Cl. ...................... 429/223; 429/215; 429/232; 429/233; 429/217
(58) Field of Search ........................... 429/49, 62, 126, 429/215, 232, 223, 233, 217

(56) References Cited

U.S. PATENT DOCUMENTS

| | | | |
|---|---|---|---|
| 3,944,432 A | 3/1976 | Brinkmann et al. ........... 136/63 |
| 4,416,915 A | 11/1983 | Palmer et al. ........... 427/126.3 |
| 5,415,948 A | 5/1995 | Gauthier et al. .............. 429/62 |
| 5,542,163 A | 8/1996 | Chang .............................. 29/2 |
| 5,599,564 A | 2/1997 | Ishihara et al. ............. 425/190 |
| 5,705,259 A | 1/1998 | Mrotek et al. .............. 428/209 |
| 5,856,773 A | 1/1999 | Chandler et al. ............. 338/22 |
| 6,051,340 A | * 4/2000 | Kawakami et al. ......... 429/220 |
| 6,153,332 A | * 11/2000 | Nishida et al. ............. 429/217 |
| 6,171,723 B1 | * 1/2001 | Loch et al. .................. 429/217 |

FOREIGN PATENT DOCUMENTS

| | | |
|---|---|---|
| JP | 61-74257 | 4/1986 |
| JP | 1-197963 | 8/1989 |
| JP | 4-58455 | 2/1992 |
| JP | 5-74493 | 3/1993 |
| JP | 6-231749 | 8/1994 |
| JP | 7-161389 | 6/1995 |
| JP | 7-220755 | 8/1995 |
| JP | 07-220755 | * 8/1995 |
| JP | 8-306354 | 11/1996 |
| JP | 9-213305 | 8/1997 |
| JP | 10-106516 | 4/1998 |
| JP | 10-241665 | 9/1998 |

\* cited by examiner

Primary Examiner—Laura Weiner
(74) Attorney, Agent, or Firm—Oblon, Spivak, McClelland, Maier & Neustadt, P.C.

(57) ABSTRACT

Conventional batteries have a problem that, in case the battery temperature should rise due to an internal short-circuit, etc., a large short-circuit current develops to generate heat. It follows that the battery temperature further increases, which can result in a further increase of the short-circuit current.

The battery of the invention, which has been completed to solve the problem, is a battery in which a positive electrode (1) has an active material containing nickel, at least one of the positive electrode (1) and a negative electrode (2) has an active material layer (6) comprising an active material (8) and an electron conductive material (9) in contact with the active material (8), and an electrolyte layer (3) is interposed between the positive electrode (1) and the negative electrode (2), wherein the electron conductive material (9) contains a conductive filler and a resin so that the electrode is designed to increase its resistivity with a temperature rise.

6 Claims, 6 Drawing Sheets

CELL AND METHOD OF PRODUCING THE SAME

TECHNICAL FIELD

This invention relates to a battery and a method of fabricating thereof. More particularly, it relates to a battery which secures safety by suppressing a temperature rise due to a short-circuit, etc. and a method of fabricating thereof.

BACKGROUND OF THE INVENTION

In recent years, with the development of electronic equipment, batteries used therein as a power source have increasingly gained in capacity and output density. A lithium ion secondary battery is attracting attention as a battery fulfilling these requirements. A lithium ion secondary battery has an advantage of high energy density but requires sufficient measures for safety because of use of a nonaqueous electrolytic solution.

Conventionally proposed safety measures include a safety valve which relieves an increased inner pressure and a PTC element which increases resistivity on heat generation due to an external short-circuit to shut off the electric current. For example, incorporation of a safety valve and a PTC element into the cap of a positive electrode of a cylindrical battery is known as disclosed in JP-A-4-328278. However, on the safety valve's working, moisture in the air enters the inside of the battery, which can induce an exothermic reaction in case lithium exists in the negative electrode.

On the other hand, a PTC element, which cuts of f the external circuit involving a short-circuit, exerts no bad influence on operating. The PTC element can be designed to operate when the battery temperature rises to, for example, 90° C. or higher due to an external short-circuit so as to be the first safety element to operate in case of abnormality.

Having the above-mentioned constitution, conventional lithium secondary batteries have the following problems.

When a short-circuit occurs in the inside of a conventional lithium secondary battery to raise temperature, the battery is incapable of suppressing an increase of the short-circuit current.

When a short-circuit occurs in the inside of a lithium secondary battery to raise temperature, a separator made of polyethylene or polypropylene interposed between a positive electrode and a negative electrode is expected to soften or melt to clog the pores of the separator, whereby the separator would exude the nonaqueous electrolytic solution contained therein or seal the nonaqueous electrolytic solution within itself to reduce its ion conductivity thereby to diminish the short-circuit current. However, the part of the separator distant from the heat generating part does not always melt. Besides, in case temperature rises, it is likely that the separator melts and flows to lose its function of electric insulation between positive and negative electrodes, which can lead to a short-circuit.

In particular, in the case of a lithium ion secondary battery, the negative electrode is prepared by coating a substrate functioning as a current collector, such as copper foil, with a slurry comprising a negative electrode active material such as graphite, a binder such as polyvinylidene fluoride (PVDF), and a solvent, and drying the coating layer to form a film. The positive electrode is similarly prepared in a film format on a substrate functioning as a current collector, such as aluminum foil. The positive electrode contains a positive electrode active material, such as $LiNiO_2$, a binder, and a conducting agent.

The conducting agent is to enhance electron conductivity of the positive electrode in case where the active material has poor electron conductivity. The conducting agent to be used includes carbon black (e.g., acetylene black) and graphite (e.g., artificial graphite KS-6, produced by Lonza).

When the temperature of such a battery increases to or above the temperature at which the separator melts and flows due to, e.g., an internal short-circuit, a large short-circuit current flows between the positive and negative electrodes at the part where the separator flows as mentioned above. It follows that the battery temperature further increases by heat generation, which can result in a further increase of the short-circuit current.

In case where $LiNiO_2$ is used as a positive electrode active material, there arises a problem that the rate of a temperature rise due to heat generation is higher because it has a greater energy density and causes a higher current value in case of a short-circuit as compared with $LiCoO_2$ which is now in wide use.

The invention has been made in order to solve the above-described problems. An object of the invention is to provide a highly safe battery which is constructed by using an electrode whose resistivity increases with temperature so that an increase in short-circuit current may be suppressed in case the battery temperature should rise due to heat generation by a short-circuit, etc.

DISCLOSURE OF THE INVENTION

A first battery according to the invention is a battery in which a positive electrode has an active material containing nickel, at least one of the positive electrode and a negative electrode has an active material layer comprising an active material and an electron conductive material in contact with the active material, and an electrolyte layer is interposed between the positive and the negative electrodes, which is characterized in that the electron conductive material contains a conductive filler and a resin and is constituted so as to increase its resistivity with a rise in temperature. According to this aspect, since the electron conductive material contains a conductive filler and a resin and is constituted so as to increase its resistivity with temperature, an increase of electric current flowing through the electrode can be suppressed when temperature rises due to heat generation by a short-circuit, etc. There is thus provided a highly safe battery.

A second battery according to the invention is the above-described first battery in which the resin comprises a crystalline resin. The resin comprising a crystalline resin according to this aspect, the rate of increase in resistivity (i.e., the rate of change in resistivity) with temperature can be heightened so that there is provided a battery which can quickly suppress an increase in current flowing through the electrode in case of a temperature rise.

A third battery according to the invention is the above-described first battery in which the resin has a melting point ranging from 90° C. to 160° C. According to this aspect, since a resin having a melting point of 90 to 160° C. is used, the electron conductive material shows an increased rate of resistivity change at around a predetermined temperature within a range of from 90 to 160° C. thereby achieving security consistent with battery characteristics.

A fourth battery according to the invention is the above-described first battery in which the electron conductive material is present in an amount of 0.5 to 15 parts by weight per 100 parts by weight of the active material. With the electron conductive material content ranging from 0.5 to 15 parts by weight per 100 parts by weight of the active material, the electrode has a reduced resistivity before the rate of resistivity change with temperature increases. As a result, the battery can have an increased discharge capacity.

A fifth battery according to the invention is the above-described first battery in which the proportion of the conductive filler in the electron conductive material is 40 to 70 parts by weight. The conductive filler content in the electron conductive material ranging from 40 to 70 parts by weight, the electrode shows an increased rate of change in resistivity in case of a temperature rise while having a reduced resistivity in its normal state, and the battery has an increased discharge capacity.

A sixth battery according to the invention is the above-described first battery in which the electron conductive material has a particle size of 0.05 to 100 μm The particle size of the electron conductive material ranging from 0.05 to 100 μm, the electrode has a reduced resistivity before the rate of resistivity change with temperature is increased, and the battery can have an increased discharge capacity.

A seventh battery according to the invention is the above-described first battery in which the conductive filler is a carbon material or a conductive non-oxide. Containing a carbon material or a conductive non-oxide as a conductive filler, the electrode has enhanced conductivity.

An eighth battery according to the invention is the above-described first battery in which the positive electrode contains a conducting agent. Since the positive electrode contains a conducting agent, the resistivity of the electrode can be properly adjusted even in using an electron conductive material having low electron conductivity.

A first method of fabricating a battery according to the invention comprises the steps of:

(a) pulverizing an electron conductive material containing a conductive filler and a resin to prepare fine particles of the electron conductive material, (b) dispersing the fine particles of the electron conductive material and an active material containing nickel in a dispersing medium to prepare an active material paste, (c) pressing the active material paste having being dried at a prescribed temperature (T1) under a prescribed pressure to form a positive electrode, and (d) laying the positive electrode, an electrolyte layer, and a negative electrode one on top of another.

Comprising the steps (a) to (d), the process provides a battery which can suppress an increase in current flowing through the electrode. Further, having the step (c), the process secures good adhesion between the electron conductive material and the active material so that the resistivity of the electrode prepared can be reduced.

A second method of fabricating a battery according to the invention is the first process wherein the resin comprises a crystalline resin. The resin comprising a crystalline resin according to this aspect, the rate of increase in resistivity (i.e., the rate of change in resistivity) with temperature can be heightened so that there is provided a battery which can quickly suppress an increase in current flowing through the electrode in case of a temperature rise.

A third method of fabricating a battery according to the invention is the first process in which the prescribed temperature (T1) is the melting point of the resin or thereabouts. By setting the prescribed temperature (T1) at or around the melting point of the resin, the improvement in adhesion between the electron conductive material and the active material is further ensured so that the resistivity of the electrode prepared can be reduced further.

BEST MODE FOR CARRYING OUT THE INVENTION

Figure 1:
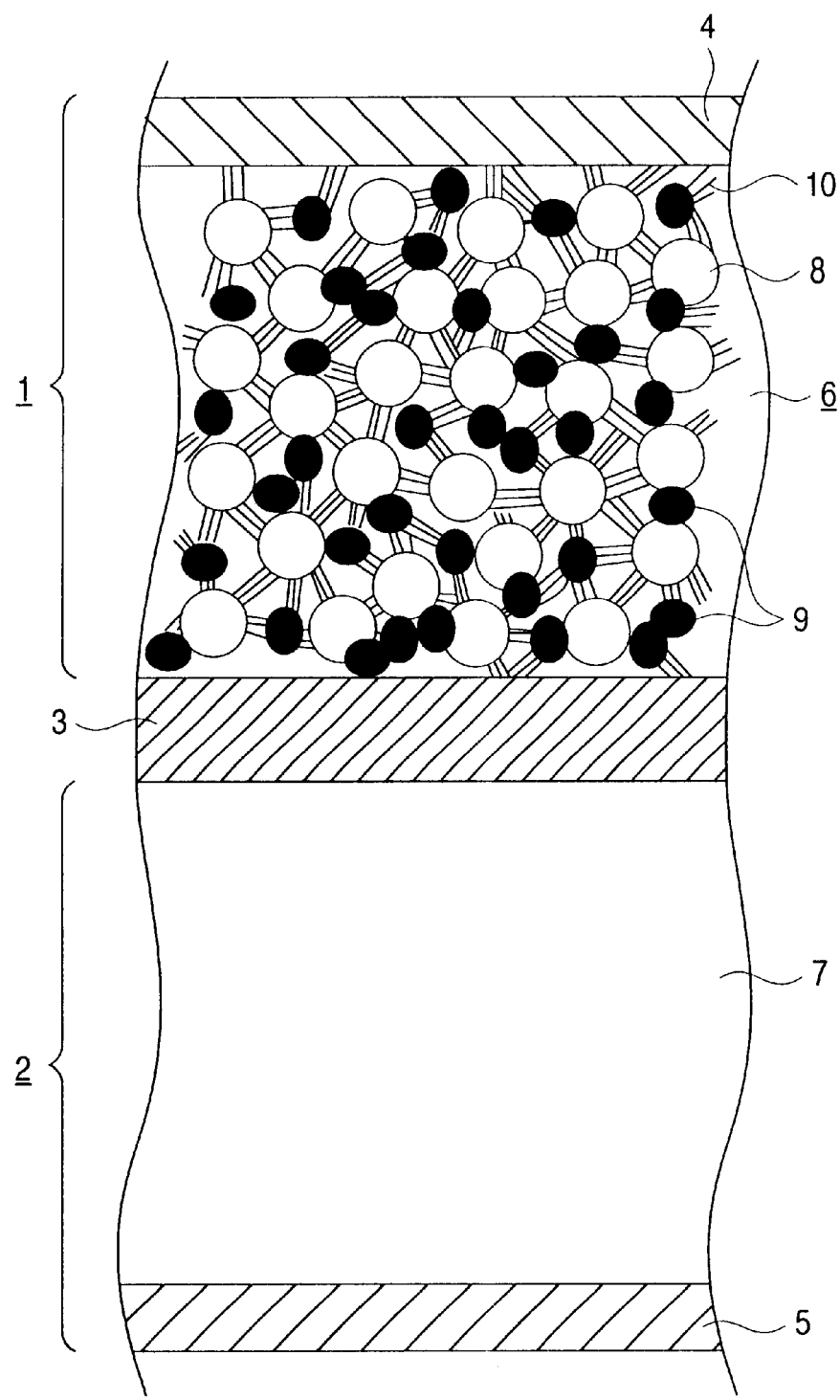
FIG. 1 is a schematic cross section for explaining the structure of the battery of Example 1.

FIG. 1 is a section for explaining the structure of the battery according to the invention. More specifically, it is a cross-sectional view of the battery. In FIG. 1, numeral 1 indicates a positive electrode having a positive electrode active material layer 6 formed on the surface of a positive electrode current collector 4. Numeral 2, a negative electrode having a negative electrode active material layer 7 formed on the surface of a negative electrode current collector 5. Numeral 3, an electrolyte layer, such as a separator, provided between the positive electrode 1 and the negative electrode 2. The separator holds an electrolytic solution containing, for example, lithium ions. It holds an ion-conducting solid polymer in a solid electrolyte type lithium battery or an ion-conducting gel polymer in a gel electrolyte type lithium battery.

The positive electrode active material layer 6, being formed on the surface of a current collector 4 comprising a metal film (e.g., an aluminum film), is made up of a positive electrode active material 8 and an electron conductive material 9 bound together by a binder 10. The electron conductive material 9 comprises a conductive filler and a resin or a crystalline resin and has such characteristics that the rate of change in resistivity with temperature increases with a rise in temperature (hereinafter the characteristics will be referred to as PTC (positive temperature coefficient)).

The positive electrode active material 8 is particulate. The electron conductive material 9 is also particulate, having a smaller size than the active material 8, preferably of from 0.05 to 100 μm. The electron conductive material 9 can be fibrous or flaky. In other words, the shape of the electron conductive material 9 is not at all limited as long as it is of such size that can be positioned among adjacent particles of the active material 8.

It is preferred for the resin to contain a crystalline resin to bring about improvement in the PTC characteristics hereinafter described (i.e., to increase the rate of change in resistivity).

The electron conducive material 9 possesses the characteristics that the rate of change in its resistivity increases in a temperature range of, for example, from 90 to 160° C. The PTC function of the electron conductive material 9 is manifested because the resin or the crystalline resin contained therein softens or melts to expand thereby to increase its own resistivity.

The conductive filler includes, for example, carbon materials and conductive non-oxides. The carbon materials include carbon black, such as acetylene black, furnace black, and lamp black, graphite, and carbon fiber. The conductive non-oxides include metal carbides, metal nitrides, metal silicides, and metal borides. The metal carbides include TiC, ZrC, VC, NbC, TaC, $Mo_2C$, WC, $B_4C$, and $Cr_3C_2$. The metal nitrides include TiN, ZrN, VN, NbN, TaN, and CrN. The metal borides include $TiB_2$, $ZrB_2$, $NbB_2$, $TaB_2$, CrB, MoB, and WB.

The resin and crystalline resin are polymers, such as high-density polyethylene (melting point: 130 to 140° C.), low-density polyethylene (melting point: 110 to 112° C.), a polyurethane elastomer (melting point: 140 to 160° C.), and polyvinyl chloride (melting point: about 145° C.). The melting point of these resins is in a range of from 90° to 160° C.

Because the temperature at which the PTC function is activated is dependent on the melting point of the resin or crystalline resin contained in the electron conductive material 9, the temperature at which the PTC function is manifested can be set within a range of from 90° to 160° C. by selecting the resin material to be used.

The PTC characteristics may be either reversible so that a temperature drop after manifestation of the PTC function is followed by restoration of the initial resistivity, or irreversible.

If the electron conductive material performs its PTC function at or below 90° C., which is favorable for security, the electrode would increase its resistivity in a temperature range in which batteries are usually used. This will lead to reduction of battery performance, such as load rate characteristics. If the temperature for manifestation of the PTC function exceeds 160° C., the inner temperature of a battery rises up to that temperature, which is unfavorable for safety. Accordingly, it is desirable that the electron conductive material 9 be designed to manifest the PTC function at a temperature ranging from 90° to 160° C.

Since the temperature at which the PTC function is activated is dependent on the melting point of the resin or crystalline resin, the resin or crystalline resin is selected from those having a melting point within a range of from 90° to 160° C.

The resistivity of the electrode in its normal state, i.e., the state before the PTC function is activated, can be controlled by varying the proportion of the electron conductive material 9 in the whole positive electrode active material layer 6. It is preferred that the electron conductive material 9 be used in a proportion of from 0.5 to 15 parts by weight per 100 parts by weight of the active material.

The proportion of the conductive filler in the electron conductive material 9 is preferably in a range of from 40 to 70 parts by weight, which is preferred for increasing the rate of change of electrode resistivity in case of a temperature rise while minimizing the resistivity of the electrode in its normal state and also for obtaining an increased discharge capacity from the battery.

The positive electrode active material 8 includes nickel oxides, such as $LiNiO_2$.

The negative electrode active material layer 7, being formed on the surface of a negative electrode current collector 5 made of a metal film (e.g., a copper film), is made up of a negative electrode active material, such as carbon particles, bound together with a binder. The active materials which can be used in the negative electrode active material layer 7 are selected from those capable of lithium ion intercalation and disintercalation, such as carbonaceous materials, and other various materials in conformity to the type of the battery.

Any metal stable in the inside of a battery can be used as a positive electrode current collector 4 and a negative electrode current collector 5. Aluminum is preferred as the positive electrode current collector 4, and copper is preferred as the negative electrode current collector 5. The form of the current collectors 4 and 5 can be any of foil, net, expanded metal, etc. Those having a large surface area, such as net or expanded metal, are preferred for securing joint strength to the active material layers 6 and 7 and for facilitating impregnation with an electrolytic solution after joining.

Materials used as the separator 3 include insulating porous film, net, nonwoven fabric, or the like that is capable of holding an electrolytic solution while securing sufficient strength. Or, an ion-conducting electrolyte layer made up of a solid polyelectrolyte or gel electrolyte can be used in place of the separator. From the standpoint of adhesion and security, a porous film made of polypropylene, polyethylene, etc. is preferably used. Some of fluorine resins, if used as a separator, need a plasma treatment to secure adhesiveness.

The electrolytic solution which can be used in organic electrolyte type lithium batteries includes solutions of an electrolyte, such as $LiPF_6$, $LiClO_4$, $LiBF_4$, $LiCF_3SO_3$, $LiN(CF_3SO_2)_2$, and $LiC(CF_3SO_2)_3$, in a solvent, such as an ether solvent, e.g., dimethoxyethane, diethoxyethane, dimethyl ether, and diethyl ether, an ester solvent, e.g., ethylene carbonate and propylene carbonate, and a mixture thereof; and other various kinds, selected in conformity with the type of the battery.

In the positive electrode 1 shown in FIG. 1, since the electron conductive material 9 contained in the positive electrode active material layer 6 exhibits PTC characteristics in itself, the active material layer 6 increases its resistivity upon the temperature of the positive electrode 1 exceeding over the temperature at which the PTC function manifests itself.

Accordingly, where an electrode having such characteristics is applied to a battery (in this particular embodiment, applied to the positive electrode of a battery), the positive electrode active material layer 6 increases its own resistivity to hinder the current flowing inside the battery in case where the current should increase due to a shortage outside or inside the battery and, as a result, the battery or electrode temperature should increase above a certain point. Thus, a battery constructed by using the electrode will have markedly increased safety. That is, the safety of the battery is maintained even in case of abnormalities under severe conditions, such as a short-circuit, a back charge, an overcharge, and the like.

While the embodiment shown in FIG. 1 has been described with a particular case in which the positive electrode active material layer 6 comprises the positive electrode active material 8, the electron conductive material 9, and the binder 10, the invention is not deemed to be limited to this embodiment. For example, where the positive electrode active material 8 contained in the positive electrode active material layer 6 is of a material having low electron conductivity, the insufficiency could be compensated for by addition of a conducting agent to the layer 6.

Further, the invention is not limited to the above disclosed structure in which the positive electrode 1, especially the positive electrode active material layer 6, contains the conductive filler and the resin or crystalline resin. It will be understood that the same effects are to be produced when a battery is assembled by applying the above-described structure to the negative electrode 2.

In the following are described a process for preparing the positive electrode 1 shown in FIG. 1, a process for preparing the negative electrode 2, and a method of fabricating a battery having the positive electrode 1 and the negative electrode 2.

Process for Preparing Positive Electrode:

An electron conductive material whose volume resistivity is sufficiently low at room temperature but high at temperatures above a prescribed value between 90° C. and 160° C. (e.g., pellets prepared by kneading a finely particulate conductive filler and a resin or a crystalline resin in a prescribed mixing ratio) is pulverized to prepare fine particles of the electron conductive material.

Pulverization of an electron conductive material is desirably carried out by a method using compressed air or compressed inert gas (e.g., nitrogen or argon). Where it is desired to obtain particularly small particles, an ultrasonic stream of the above-mentioned gas is generated, and the electron conductive material particles are made to collide with each other or against a wall (not shown) in this gas stream (this mode is called a jet mill method).

Where there is no particular necessity of reducing the size of the electron conductive material particles more than necessity, a method for pulverizing the electron conductive material by rotating the electron conductive material in a ball mill instead of using compressed air (this method is called a ball mill method).

The resulting fine particles of the electron conductive material, a positive electrode active material (e.g., $LiNiO_2$), and a binder (e.g., PVDF) are dispersed in a dispersing medium (e.g., N-methylpyrrolidone, hereinafter abbreviated as NMP) to prepare a positive electrode active material paste.

The resulting paste is applied to a current collector substrate (e.g., a metal film of prescribed thickness) which will serve as a positive electrode current collector 4. After drying, the coating layer is pressed at a prescribed temperature under a prescribed planar pressure to form a positive electrode active material layer 6 having a desired thickness to obtain a positive electrode 1.

According to the above-described method of fabricating the positive electrode 1, since the pressing is carried out at a prescribed temperature under a prescribed planar pressure, the electron conductive material 9 and the positive electrode active material 8 are brought into contact with improved adhesion thereby to reduce the electrode resistance in the normal state. In other words, the resistivity of the electrode prepared can be controlled by adjusting the temperature and pressure (planar pressure) in pressing the electrode. In particular, where the prescribed pressing temperature is set at the melting point of the resin or crystalline resin contained in the electron conductive material or thereabouts, the adhesion between the electron conductive material 9 and the active material 8 is further improved to further reduce the resistance of the electrode in its normal state.

While an embodiment in which a positive electrode active material paste is pressed at a prescribed temperature under a prescribed planar pressure has been explained, the positive electrode 1 can also be obtained by pressing a positive electrode active material paste under a prescribed planar pressure, followed by heating at a prescribed temperature (desirably the melting point or thereabouts).

A process for preparing a negative electrode 2 is described below.

Process for Preparing Negative Electrode:

A negative electrode active material paste is prepared by dispersing a negative electrode active material, such as mesophase carbon microbeads (hereinafter abbreviated as MCMB), and PVDF in NMP. The resulting paste is applied to a metal film of prescribed thickness which will serve as a negative electrode current collector to obtain a negative electrode 2 having a negative electrode active material layer 7.

A method of fabricating the battery according to the invention will be described.

Method of Fabricating Battery:

The positive and the negative electrodes prepared above are joined together with, for example, a porous polypropylene sheet interposed therebetween to obtain a battery having the positive and the negative electrodes. The battery thus obtained increases the resistivity of the positive electrode and of the interface between the separator and the positive electrode with an increase in temperature. In case a short-circuit should occur outside or inside the battery to raise the battery temperature, the battery suppresses an increase of the short-circuit current thereby securing improved safety.

While in the above-mentioned process the electron conductive material is present in the positive electrode 1, it can be incorporated into the negative electrode 2 or both of the positive electrode 1 and the negative electrode 2.

Specific examples of the invention will be given below, but it should be understood that the invention is not deemed to be limited thereto.

EXAMPLE 1

Preparation of Positive Electrode:

An electron conductive material having a volume resistivity of 0.2 $\Omega \cdot cm$ at room temperature and of 20 $\Omega \cdot cm$ at 135° C. (e.g., a kneaded mixture of 60 parts by weight of carbon black and 40 parts by weight of polyethylene) was finely ground by a jet mill method to prepare a finely particulate electron conductive material.

Six parts by weight of the finely particulate electron conductive material, 91 parts by weight of a positive electrode active material ($LiNiO_2$), and 3 parts by weight of a binder (e.g., PVDF) were dispersed in NMP, a dispersing medium, to prepare a positive electrode active material paste.

The paste was applied to a 20 $\mu$m thick metal film (aluminum foil) serving as a positive electrode current collector 4 by a doctor blade coating method, dried at 80° C., and pressed at room temperature under a planar pressure of 2 ton/cm$^2$ to obtain a positive electrode 1 having an about 100 $\mu$m thick positive electrode active material layer 6.

Preparation of Negative Electrode:

A negative electrode active material paste prepared by dispersing 90 parts by weight of MCMB and 10 parts by weight of PVDF in NMP was applied to 20 $\mu$m thick copper foil, a negative electrode current collector, by a doctor blade coating method to obtain a negative electrode 2 having a negative electrode active material layer 7.

Preparation of Battery:

The positive and the negative electrodes prepared above were joined together with a porous polypropylene sheet (Cell Guard #2400, produced by Hoechst) interposed therebetween to obtain a battery having the positive and the negative electrodes.

Evaluation of Electrode and Battery:

The electrode and the battery of the invention were evaluated in accordance with the following methods.

Measurement of Resistivity of Electrode:

Aluminum foil was fusion bonded to both sides of the electrode. A voltage terminal and a current terminal of plus side were connected to the aluminum foil on one side, and those of minus side to the aluminum foil on the other side. The terminals were equipped with a heater. A constant current was made to flow while heating the electrode at a rate of 5° C./min, and a reduction in voltage was measured to determine the resistivity (volume resistivity; Ω·cm).

Capacity Test:

The prepared positive and negative electrodes were both cut to a size of 14 mm×14 mm. A cut piece of the positive electrode and a cut piece of the negative electrode were joined together with a porous polypropylene sheet (Cell Guard #2400, produced by Hoechst) interposed therebetween as a separator 3 to prepare a battery body. A current collecting tab was spot welded to each of the positive and the negative electrode current collectors, and the electrode body was put in a bag made of an aluminum laminate sheet. An electrolytic solution was poured into the bag, and the opening of the bag was heat-sealed to complete a battery. The resulting battery was subjected to a charge and discharge test at room temperature.

Short-circuit Test:

The prepared positive and negative electrodes were both cut to sizes of 14 mm×14 mm. A cut piece of the positive electrode and a cut piece of the negative electrode were joined with a porous polypropylene sheet (Cell Guard #2400, produced by Hoechst) interposed therebetween to prepare a unit electrode body. Ten unit electrode bodies were piled up, and a current collecting tab was connected to the end of every positive electrode current collector and every negative electrode current collector and spot-welded among the positive electrodes and among the negative electrodes to electrically connect the unit electrode bodies in parallel to form a laminated battery body.

The laminated battery body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was put in the bag, and the opening of the bag was heat-sealed to complete a battery.

The resulting battery was charged at 8.0 mA up to 4.1 V at room temperature. After completion of charging, the battery temperature was gradually elevated from room temperature, and a short-circuit was caused between the positive and the negative electrodes at a prescribed temperature. The current at this time was measured.

COMPARATIVE EXAMPLE 1

For comparison, artificial graphite KS-6 (produced by Lonza) was used as an electron conductive material. A positive electrode active material paste was prepared by dispersing 6 parts by weight of fine particles of the artificial graphite KS-6, 91 parts by weight of a positive electrode active material (LiNiO$_2$), and 3 parts by weight of a binder (PVDF) in NMP, a dispersing medium. The resulting paste was applied to a 20 μm thick metal film (aluminum foil) serving as a positive electrode current collector 4 by a doctor blade coating method, dried at 80° C., and pressed at room temperature under a planar pressure of 2 ton/cm$^2$ to obtain a positive electrode having a positive electrode active material layer 6 having a thickness of about 100 μm. A negative electrode was prepared in the same manner as in Example 1. A battery was prepared in the same manner as in Example, except for using the resulting positive electrode.

Table 1 shows the characteristics of the batteries prepared in Example 1 and Comparative Example 1, specifically the volume resistivity of the electrodes, the rate of resistivity change, and the discharge capacity of the batteries. In Table 1, the rate of resistivity change is the quotient obtained by dividing the volume resistivity after manifestation of the PTC function by the volume resistivity before the manifestation.

TABLE 1

|  | Volume Resistivity (Ω cm) | Rate of Resistivity Change | Discharge Capacity (mAh) |
| --- | --- | --- | --- |
| Example 1 | 100 | 50 | 5.1 |
| Comparative Example 1 | 60 | 1.1 | 5.1 |

It can be seen from Table 1 that Comparative Example 1, in which the electron conductive material contains no resin, has a smaller rate of resistivity change than Example 1. It is understood that, in Example 1, because a crystalline resin is mixed into the electrode, specifically the electron conductive material of the positive electrode active material layer, the resistivity after manifestation of the PTC function is 50 times as high as the resistivity before the manifestation.

Accordingly, a battery constructed by using the electrode of Example 1 manifests the PTC function when the temperature inside the battery exceeds a prescribed temperature. Thus, the short-circuit current can be prevented from further increasing, and the safety and reliability of the battery are improved.

While the rate of resistivity change attained in Example 1 is 50, the rate of resistivity change is not limited thereto. The above-mentioned effects would be produced as long as the rate of resistivity change ranges from about 1.5 to 10000.

Figure 2:
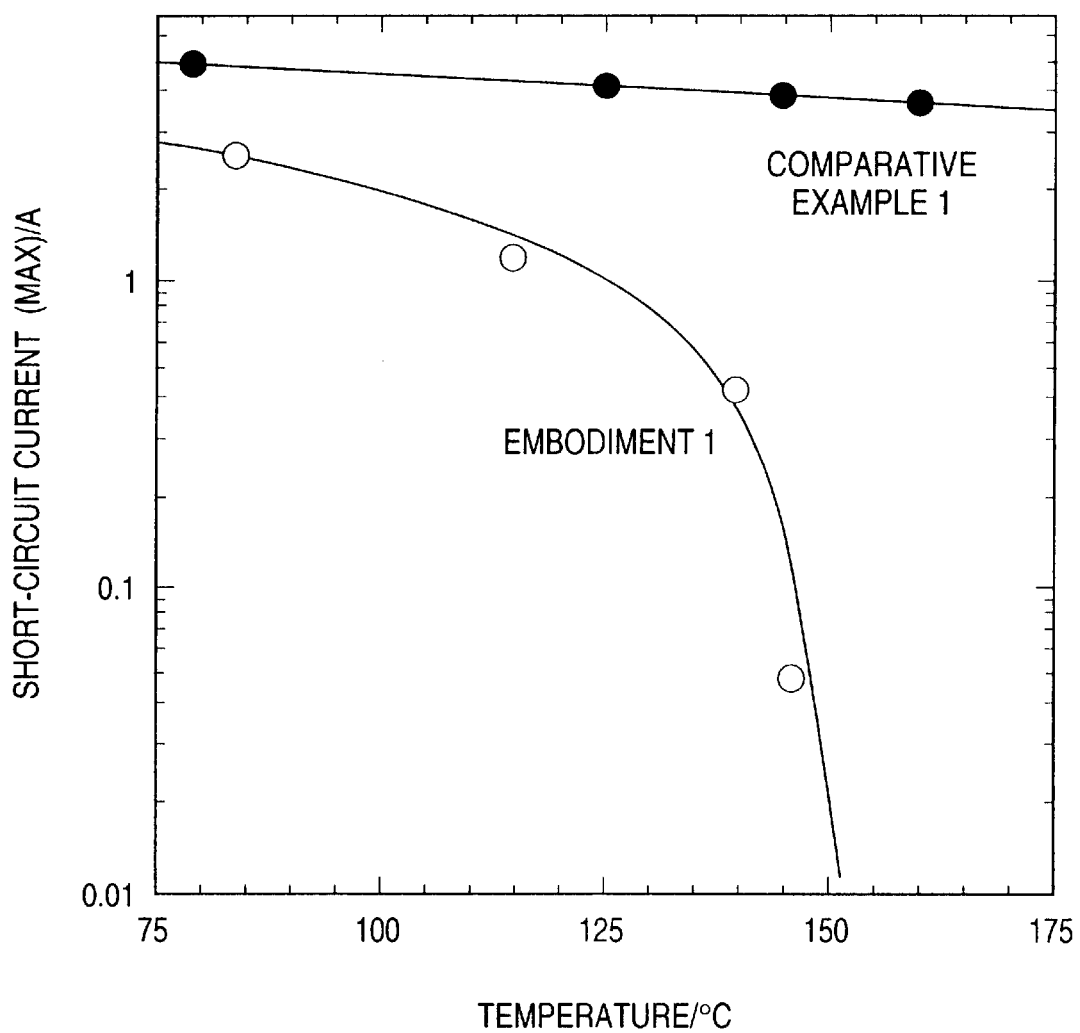
FIG. 2 is a graph showing the relationship between electrode temperature and short-circuit current in a short-circuit current test at varied temperatures conducted in Example 1.

FIG. 2 is a graph showing the relationship between temperature and maximum short-circuit current in the short-circuit test of the batteries of Example 1 and Comparative Example 1. Since the battery of Example 1 manifests the PTC function when its temperature rises to around a prescribed temperature, when a short-circuit occurs at a temperature higher than about 120° C., the maximum short-circuit current abruptly falls, whereas the battery of Comparative Example 1 keeps the high short-circuit current after the temperature exceeds that point.

Comparing Example 1 with Comparative Example 1, since the electrode of Example 1, specifically the electron conductive material of the positive electrode active material layer contains a crystalline resin, the battery constructed by using the electrode activates the PTC function upon the inner temperature increasing above a prescribed temperature, suppressing a further increase in short-circuit current before the battery temperature exceeds 160° C. Thus, the battery has improved safety and reliability.

COMPARATIVE EXAMPLE 2

A positive electrode was prepared in the same manner as in Example 1, except that pellets obtained by kneading 60 parts by weight of fine particles of carbon black and 40 parts by weight of a polypropylene resin (melting point: 168° C.) were finely ground by a jet mill method to obtain a finely particulate electron conductive material 9. A battery was prepared in the same manner as in Example 1 by using the resulting positive electrode.

Figure 3:
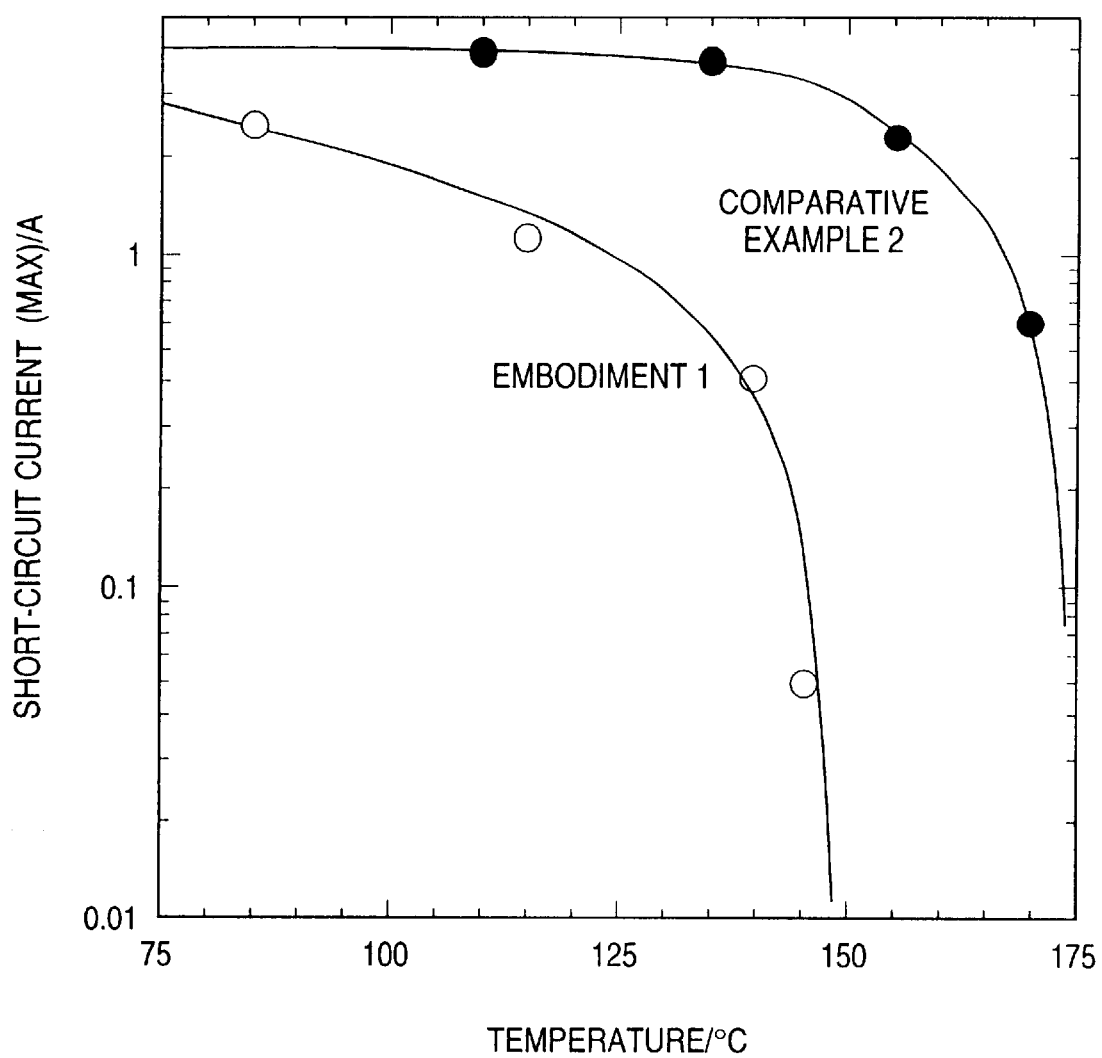
FIG. 3 is a graph showing the relationship between electrode temperature and short-circuit current in a short-circuit current test at varied temperatures conducted in Example 1.

FIG. 3 is a graph depicting the relationship between temperature and maximum short-circuit current in the short-circuit test of the batteries of Example 1 and Comparative Example 2. As shown, the temperature for PTC function manifestation exceeded 160° C. in Comparative Example 2. This is considered to be because the crystalline resin used was the polypropylene resin whose melting point was 168° C. so that the temperature of PTC function manifestation exceeded 160° C. when the electrode was applied to the battery.

To the contrary, containing polyethylene whose melting point was lower than 160° C. was used as a crystalline resin, the battery of Example 1 suppressed an increase in short-circuit current before the battery temperature exceeded 160° C. thereby securing further improvements in safety and reliability.

In Example 1, the PTC function is performed at temperatures above 120° C. to decrease the short-circuit current. In Comparative Example 2, on the other hand, since the temperature for PTC function manifestation is high, it is not until the temperature reaches 160° C. that a reduction in short-circuit current is observed. This is due to the high melting point of the crystalline resin (polypropylene) contained in the electron conductive material.

It is thus understood that the temperature at which a PTC function is activated can be set at temperatures lower than 160° C. without involving reductions in battery performance by selecting the crystalline resin to be used in the electron conductive material 9 from among those having a melting point ranging from 90° C. to 160° C.

COMPARATIVE EXAMPLE 3

A positive electrode was prepared in the same manner as in Example 1, except that pellets obtained by kneading 38 parts by weight of carbon black and 62 parts by weight of polyethylene were finely ground by a jet mill method to obtain a finely particulate electron conductive material. A battery was prepared in the same manner as in Example 1 by using the resulting positive electrode.

COMPARATIVE EXAMPLE 4

A positive electrode was prepared in the same manner as in Example 1, except that pellets obtained by kneading 71 parts by weight of carbon black and 29 parts by weight of polyethylene were finely ground by a jet mill method to obtain a finely particulate electron conductive material. A battery was prepared in the same manner as in Example 1 by using the resulting positive electrode.

Table 2 presents comparisons between Example 1 and Comparative Examples 3 and 4, showing the volume resistivity of the electrodes, the rate of resistivity change with a temperature rise, the discharge capacity of the batteries at an hour rate of 2C, and the maximum short-circuit current at 140° C.

TABLE 2

| | Volume Resistivity (Ω cm) | Rate of Resistivity Change with Temp. Rise | Discharge Capacity (mAh) | Max. Short-Circuit Current at 140° C. (mA) |
| --- | --- | --- | --- | --- |
| Example 1 | 100 | 50 | 5.1 | 0.4 |
| Comparative Example 3 | 521 | 112 | 1.2 | 0.3 |
| Comparative Example 4 | 62 | 1.7 | 5.1 | 2.8 |

As is apparent from Table 2, Comparative Example 3 shows a greater rate of change in resistivity than Example 1 but a lower discharge capacity on account of the higher resistivity of the electrode.

Although Comparative Example 4 has a higher discharge capacity than Example 1, the PTC function is insufficient due to the too large proportion of carbon black so that no appreciable decrease in short-circuit current was observed in the short-circuit test.

It is thus understood that the rate of change in resistivity of the electrode and the discharge capacity of the battery can be set at appropriate values by varying the proportion of the conductive filler to be used in the electron conductive material. In particular, the proportion of the conductive filler contained in the electrode being adjusted between 40 and 70 parts by weight, the electrode will have a high rate of change in resistivity, and the battery constructed by using the electrode will have an increased discharge capacity.

Further, with the proportion of the conductive filler in the electron conductive material being between 50 and 68 parts by weight, the characteristics of the electrode and of the battery will further be improved.

EXAMPLE 2

Figure 4:
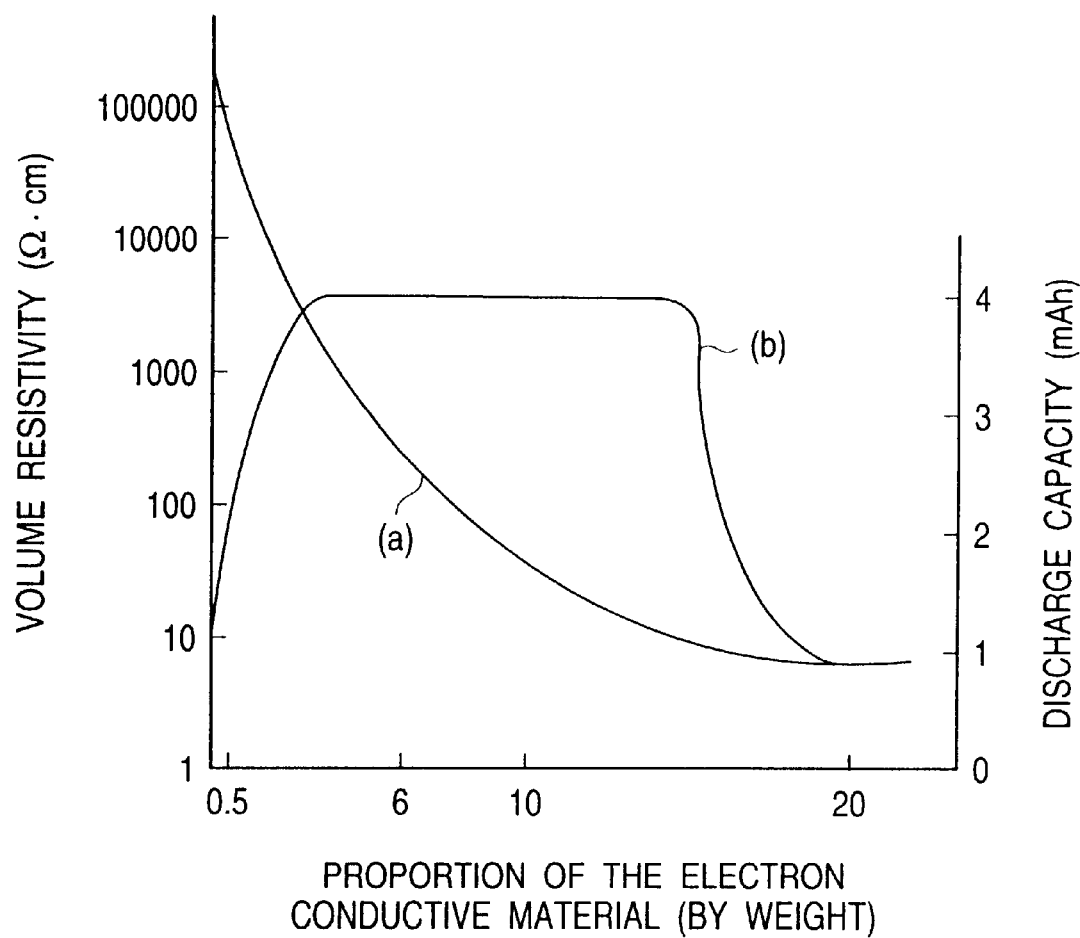
FIG. 4 is a graph showing the relationships between the proportion of an electron conductive material and volume resistivity of the electrode and between the proportion of an electron conducive material and discharge capacity of the battery in Example 2.

Positive electrodes were prepared in the same manner as in Example 1, except that the proportion of the electron conductive material was varied. In FIG. 4 are displayed the relationship between the proportion of the electron conductive material and the volume resistivity of the electrode and between the proportion of the electron conductive material and the discharge capacity. More specifically, FIG. 4 shows the relationship between the proportion of the electron conductive material per 100 parts by weight of the total solids content of the electrode (positive electrode) and the volume resistivity of the electrode (curve (a)) and the relationship between the proportion of the electron conductive material per 100 parts by weight of the total solids content of the electrode (positive electrode) and the discharge capacity (curve (b)).

As shown in the Figure, if the proportion of the electron conductive material is 0.5 parts by weight or less, the electrode itself has too high a resistivity in the normal state, resulting in a low discharge capacity, which is problematical for battery performance. If it is 15 parts by weight or more, the amount of the active material reduces to decrease the discharge capacity.

Accordingly, it is understood that the proportion of the electron conductive material ranging from 0.5 to 15 parts by weight per 100 parts by weight of the total solids content of the electrode assures a reduced resistivity of the electrode in its normal state and an increased discharge capacity of the battery using the electrode. Preferably, these characteristics can further be improved by adjusting the proportion in a range of from 0.7 to 12 parts by weight, particularly 1 to 10 parts by weight.

EXAMPLE 3

Figure 5:
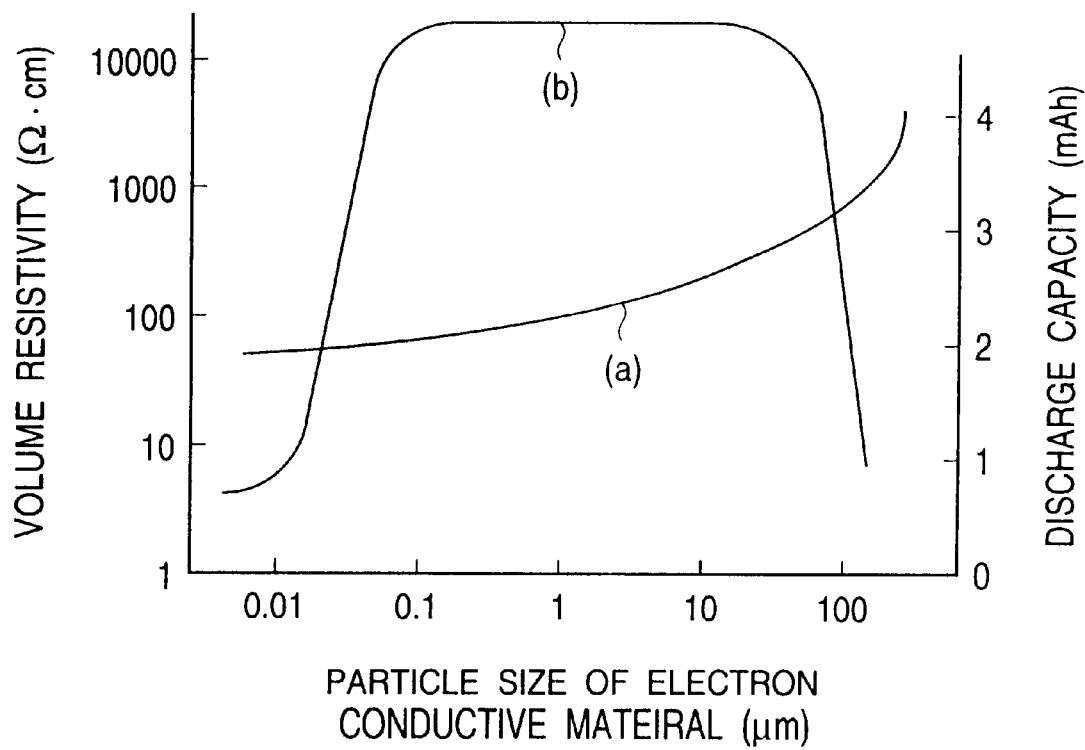
FIG. 5 is a graph showing the relationships between the particle size of an electron conductive material and the volume resistivity of the electrode and between the particle size of an electron conductive material and discharge capacity of the battery in Example 3.

Positive electrodes were prepared in the same manner as in Example 1, except that the particle size of the electron conductive material was varied. FIG. 5 shows the relationship between the particle size of the electron conductive material and the resistivity of the electrode (curve (a)) and the relationship between the particle size of the electron conductive material and the discharge capacity (curve (b)).

With the particle size of the electron conductive material being 0.05 μm or smaller, the packing of the electron conductive material decreases, which means that the volume of the electron conductive material per unit volume of the positive electrode active material layer increases, that is, the weight of the positive electrode active material decreases. In other words, if the particle size of the electron conductive material is 0.05 μm or smaller, the discharge capacity is lessened. If the particle size of the electron conductive material exceeds 100 μm, the resistivity of the electrode itself becomes high, and the discharge capacity decreases.

It is understood therefore that the resistivity of the electrode in its normal state can be reduced, and the discharge capacity can be increased by adjusting the average particle size of the electron conductive material between 0.05 μm and 100 μm. With the average particle size of the electron conductive material ranging from 0.1 to 50 μm, particularly 0.5 to 20 μm, the volumetric ratio of the electron conductive material, the volume resistivity of the electrode itself, and the discharge capacity can further be improved.

EXAMPLE 4

Pellets of an electron conductive material having a volume resistivity of 0.2 Ω·cm at room temperature and 20 Ω·cm at 135° C. (obtained by kneading 60 parts by weight of finely particulate carbon black and 40 parts by weight of polyethylene) were finely ground in a ball mill to prepare a finely particulate electron conductive material.

An electrode (positive electrode) was prepared in the same manner as in Example 1, except by using the resulting finely particulate electron conductive material. A negative electrode and a battery were prepared in the same manner as in Example 1.

Table 3 shows the average particle size of the electron conductive material, the resistivity of the electrode, and the discharge capacity of the battery. Since, in this Example, the electron conductive material is pulverized by a ball mill method, the resulting electron conductive material has a large average particle size. It follows that the volume resistivity of the electrode is increased, and the discharge capacity is decreased, and yet the battery is practically useful.

TABLE 3

|  | Average Particle Size of Electron Conductive Material (μm) | Volume Resistivity (Ω cm) | Discharge Capacity (mAh) |
| --- | --- | --- | --- |
| Example 1 | 9.1 | 100 | 5.1 |
| Example 4 | 52.3 | 932 | 2.9 |

As is understood from the results shown above, in order to reduce the resistivity of the electrode in its normal state and to increase the discharge capacity of the battery, it is desirable to pulverize the electron conductive material by a jet mill method.

EXAMPLE 5

Example 5 is characterized in that the electrode (positive electrode) was prepared in the same manner as in Example 1, except that the positive electrode active material paste was applied on aluminum foil, dried at 80° C., and pressed at 135° C. under a pressure of 0.5 ton/cm² for 30 minutes. The methods for preparing a negative electrode and a battery were the same as in Example 1. In Table 4 are shown the characteristics of the resulting electrode and the battery together with those of the electrode and the battery of Example 1.

TABLE 4

|  | Porosity (%) | Volume Resistivity (Ω cm) | Discharge Capacity (mAh) |
| --- | --- | --- | --- |
| Example 1 | 30 | 100 | 4.3 |
| Example 5 | 25 | 87 | 4.3 |

Because in Example 5 the dried positive electrode active material paste was pressed at around the melting point of the crystalline resin contained in the electron conductive material, the adhesion between the electron conductive material and the active material was improved. As a result, the resistance of the electrode in its normal state was reduced as shown in Table 4. These results indicate that the resistivity of an electrode can be controlled by adjusting the temperature and pressure (planar pressure in this case) in pressing the dried active material paste. In particular, where the temperature for pressing the dried positive electrode active material paste is set at or about the melting point of the crystalline resin contained in the electron conductive material, reduction in volume resistivity of the electrode in the normal state can be secured even though the pressing pressure is somewhat lowered because the pressing is carried out at around the melting point of the crystalline resin.

EXAMPLE 6

Preparation of Positive Electrode:

An electron conductive material having a volume resistivity of 0.2 Ω·cm at room temperature and of 500 Ω·cm at a working temperature of 135° C. (for example, pellets obtained by kneading carbon black and polyethylene in a prescribed ratio) was pulverized in a jet mill to prepare fine particles of the electron conductive material having an average particle size of 9.0 μm.

Four-point-five parts by weight of the particulate electron conductive material, 1.5 parts by weight of artificial graphite KS-6 (produced by Lonza) as a conducting agent, 91 parts by weight of an active material ($LiNiO_2$), and 3 parts by weight of a binder (PVDF) were dispersed in NMP, a dispersing medium, to prepare a positive electrode active material paste.

The resulting paste was applied to a 20 μm thick metal film (aluminum foil) serving as a positive electrode current collector 4 by a doctor blade coating method, dried at 80° C., and pressed at a prescribed temperature (e.g., room temperature) and under a prescribed planar pressure (2 ton/cm²) to obtain a positive electrode 1 having an about 100 μm thick positive electrode active material layer 6. The methods for preparing a negative electrode and a battery were the same as in Example 1.

In Table 5 are shown the characteristics of the electrode and the battery of Example 6 and the electrode and the battery of Example 1. Specifically, Table 5 shows the volume resistivity of the electrodes, the rate of change in resistivity, and the discharge capacity.

TABLE 5

|  | Volume Resistivity (Ω cm) | Discharge Capacity (mAh) | Max. Short-Circuit Current at 140° C. (mA) |
| --- | --- | --- | --- |
| Example 1 | 100 | 4.3 | 0.20 |
| Example 6 | 81 | 4.3 | 0.25 |

As compared with Example 1, the electrode of Example 6 proved almost equal in both resistivity and rate of change in resistivity. It is thus recognized that addition of a conducting agent makes it possible to reduce the volume resistivity of an electrode in its normal state and to increase the discharge capacity even in using an electron conductive material having a high volume resistivity.

It is not necessary to limit the conducting agent to be used to the graphite used here (i.e., artificial graphite KS-6, produced by Lonza). The conducting agent can be of any substance that serves to enhance the conductivity of the positive electrode active material layer without performing a PTC function, such as carbon black, e.g., acetylene black or lamp black.

The positive electrode active material may be a nickel oxide or a nickel-containing active material having part of a metal element displaced with nickel.

The electrodes and batteries illustrated in the foregoing Examples are useful in not only lithium ion secondary batteries of organic electrolytic solution type, solid electrolyte type or gel electrolyte type but primary batteries, such as a lithium/manganese dioxide battery, and other types of secondary batteries. They are also effective in aqueous solution type primary or secondary batteries. In addition, the applications are not limited by the battery shape, and they are applicable to primary and secondary batteries of laminated type, rolled type, button type, and so forth.

Figure 6:
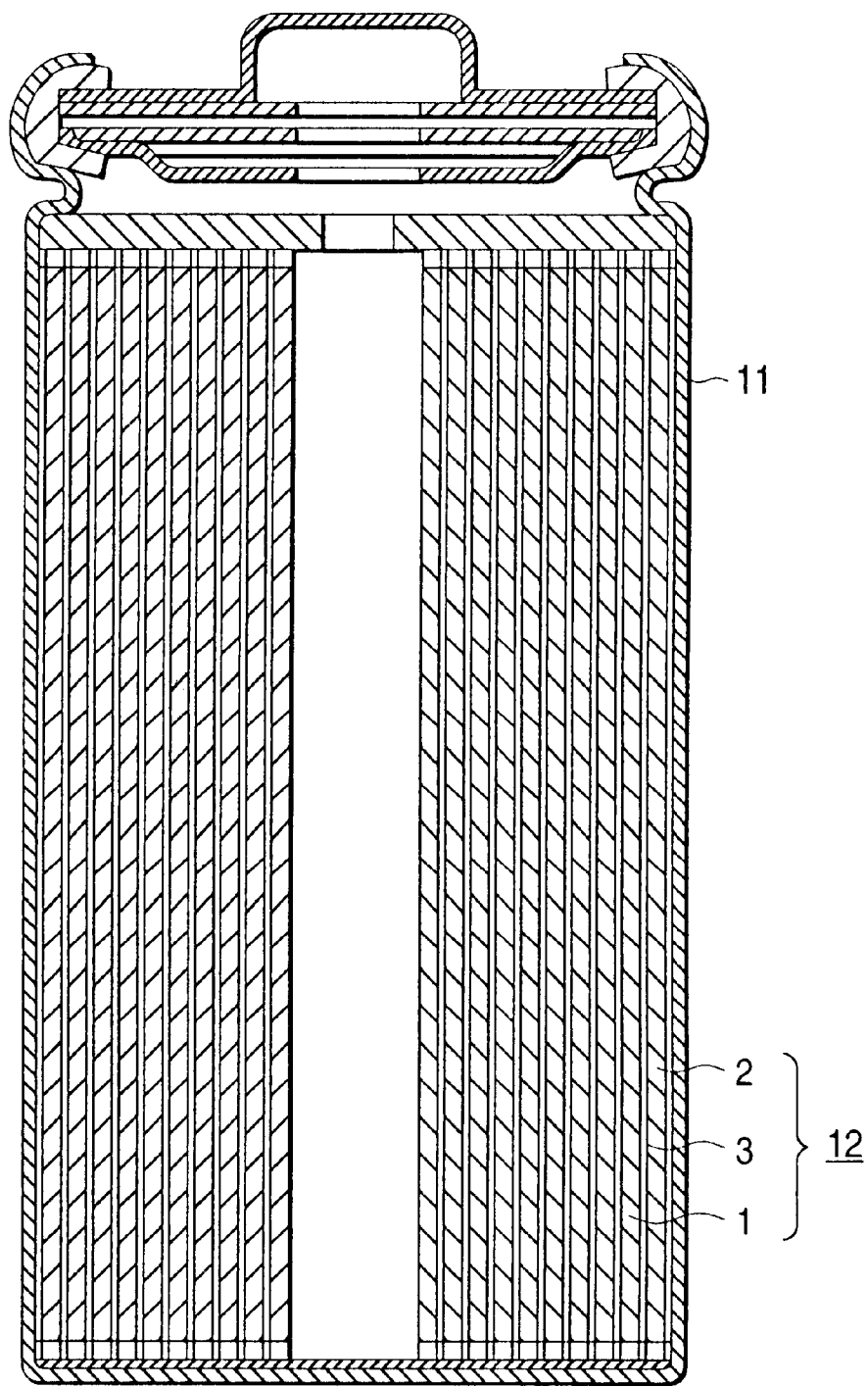
FIG. 6 is a cross sectional view showing a cylindrical battery.

FIG. 6 is a schematic cross section illustrating the structure of a cylindrical lithium ion secondary battery, wherein numeral 11 is a case made of stainless steel, etc. which also serves as a negative electrode terminal, and numeral 12 is a battery body put in the case 11. The battery body 12 has a roll form in which a positive electrode 1, a separator 3, and a negative electrode 2 are rolled up together. The positive electrode 1 of the battery body 12 has any one of the electrode structures described in Examples 1 to 6. Or, the structure may be designed so that the electron conductive material comprising a crystalline resin and a conductive filler is incorporated into the negative electrode active material layer of the negative electrode 2.

Industrial Applicability

The battery and the method of fabricating thereof according to the present invention are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is no object, and applications include primary and secondary batteries of laminated type, rolled type, button type, and the like.

What is claimed is:

1. A battery comprising:
   a positive electrode and negative electrode, each including:
      an electronic conducting current collector; and
      an electrode active material layer formed on the electronic conducting current collector, the electrode active material layer having active material particles, wherein the active material layer in the positive electrode contains nickel;
   the electrode active material layer in at least one of the positive electrode and the negative electrode includes electronic conducting material particles; and
   the electronic conducting material particles comprise a mixture of a conductive filler and a resin exhibiting a positive temperature coefficient (PTC) characteristic in which resistance increases as a function of a rise in temperature thereof.

2. The battery as set forth in claim 1, wherein the resin comprises a crystalline resin.

3. The battery as set forth in claim 1, wherein the resin is a material selected from the group consisting of a polyethylene, polyurethane elastomer and polyvinyl chloride.

4. The battery as set forth in claim 1, wherein the active material of the positive electrode is a nickel oxide or nickel-containing material having a part of a material element displaced with nickel.

5. The battery as set forth in claim 1, wherein said mixture exhibits increased resistance due to the PTC characteristic of the mixture at temperatures of 90° C. and higher.

6. The battery as set forth in claim 1, wherein said electrode active material layer further comprises a binder material.

* * * * *